United States Patent [19]

Hare et al.

[11] Patent Number: 5,266,373
[45] Date of Patent: Nov. 30, 1993

[54] OPTICAL SCANNING OF IMAGES

[75] Inventors: David G. Hare; Robert Rayner, both of Hertfordshire, England

[73] Assignee: Crosfield Electronics Limited, England

[21] Appl. No.: 772,564

[22] Filed: Oct. 7, 1991

[30] Foreign Application Priority Data

Oct. 8, 1990 [GB] United Kingdom ............... 9021808

[51] Int. Cl.$^5$ ............................................. A61F 13/02
[52] U.S. Cl. ................................... 428/40; 428/195; 428/355; 428/913
[58] Field of Search ............... 428/40, 195, 355, 500, 428/515, 913

[56] References Cited

U.S. PATENT DOCUMENTS

| | | | |
|---|---|---|---|
| 3,783,072 | 1/1974 | Korpman | 156/244 |
| 4,162,343 | 7/1979 | Wilcox | 428/913 |
| 4,581,267 | 4/1986 | Miller | 428/40 |
| 5,006,407 | 4/1991 | Malhotra | 428/195 |
| 5,110,728 | 3/1992 | Plamthottam | 428/355 |

FOREIGN PATENT DOCUMENTS 1485066 9/1977 United Kingdom .
2197964 6/1988 United Kingdom .

*Primary Examiner*—Patrick J. Ryan
*Assistant Examiner*—Elizabeth Evans
*Attorney, Agent, or Firm*—Ostrolenk, Faber, Gerb & Soffen

[57] ABSTRACT

An assembly that can be optically scanned and that comprises a transparency that includes an image and that is carried by a transparent support to which it is secured and with which it is in intimate fluid contact wherein the fluid contact is provided by an overall layer of pressure sensitive adhesive that has a refractive index substantially the same as the refractive index of the transparency and that releasably secures the transparency to the support.

10 Claims, No Drawings

OPTICAL SCANNING OF IMAGES

In order to read or input an image which is included in a transparency it is known to transmit light through the transparency and to detect the transmitted light from point to point. The transparency is carried by a transparent support and has to be secured firmly to this support in order to prevent movement. For instance the support can be a cylinder which is rotated whilst a light detecting system moves axially along the exterior of the cylinder and the image is read in adjacent circumferential lines. The transparency must be secured to the support and at present normal practice is to secure it along opposite edges of the transparency. For instance one edge of the transparency is secured to the support by a strip of pressure-sensitive tape such as Sellotape (trade mark), the transparency may be pulled tight over the support and the opposite edge is also secured by pressure-sensitive tape to the support.

It is necessary that the transparency should be in intimate fluid contact with the transparent support so as to exclude air between the transparency and the support and so as to fill in scratches or other surface blemishes in the support or, more usually, the transparency. This is normally achieved by providing a film of oil between the transparency and the support.

Thus, when applying the transparency to a cylindrical support, one edge of the transparency is secured by adhesive tape axially on the cylindrical support, oil is provided between the abutting faces of the transparency and the cylindrical support and the transparency is then pressed against the support, starting from the secured edge, so as to exclude air and fill in any scratches with oil, excess oil is then wiped away, and the distant edge of the transparency is fixed to the cylindrical support by adhesive tape.

This system is messy and awkward but no better system has previously been devised.

According to the invention, an assembly that can be optically scanned comprises a transparency that includes an image and that is carried by a transparent support to which it is secured and with which it is in intimate fluid contact, and the assembly is characterised in that the fluid contact is provided by an overall layer of pressure sensitive adhesive that has a refractive index substantially the same as the refractive index of the transparency and that releasably secures the transparency to the support.

Thus in the invention the oil is eliminated and the adhesive is relied upon to ensure absence of air and optical correction of scratches or other surface blemishes, and the adhesive also secured the transparency to the support. Thus it is possible to eliminate also the need for adhesive tape or other means for holding the edges of the transparency against the support.

It is possible to apply the adhesive to the support and then to press the transparency on to the adhesive-coated support but generally it is more convenient to apply the adhesive to the transparency and then apply the adhesive-coated surface of the transparency to the support.

The application of the adhesive can be conducted manually but preferably is conducted mechanically and thus the invention includes also an apparatus for forming the described assembly, this apparatus comprising means for applying an overall coating of pressure-sensitive adhesive on to the surface of the transparency and means for pressing the adhesive-coated surface of the transparency against the support. Generally the means for pressing the transparency against the support comprise at least one roller that presses the transparency against the support.

The means for applying the overall coating of the pressure-sensitive adhesive may be spray means, by which a sprayable form of the pressure-sensitive adhesive can be sprayed on to the transparency. Alternatively the means for applying the coating of adhesive can comprise spread-coating means. A suitable spread-coater comprises a transfer roll, whereby adhesive is applied on to the transfer roll and is then transferred by this roll as a substantially uniform coating on to the transparency.

If the adhesive is to be sprayed, it is usually necessary for it to be sprayed as a composition having much lower viscosity than is required for the final adhesive coating, and so preferably it is sprayed as a composition that is diluted by a volatile solvent, and this solvent is evaporated either during or after spraying, so that the coating has the desired properties. When the coating is being applied by spread coating or other means, again it may be applied from a composition in a volatile solvent that evaporates during or after the coating operation, but preferably the pressure-sensitive adhesive is applied substantially in the form of the composition that is to form a final coating, i.e., without any significant evaporation of solvent from the composition.

The pressure-sensitive adhesive must be a material that will wet thoroughly the surface of the transparency and will provide fluid contact between the transparency and the adhesive, thereby filling in any scratches and permitting the exclusion of air from between the transparency and the support. It must also have a refractive index substantially the same as the refractive index of the transparency so that it will optically fill in scratches and blemishes so that they are substantially undetectable. For instance the adhesive coating, the transparency and the support preferably have refractive indices all within a range of about 0.2, and preferably the refractive index of the adhesive differs from each of the other refractive indices by not more than 0.1.

The adhesive must secure the transparency to the support releasably, in order to permit easy removal of the transparency from the support. If the adhesive has any tendency to leave adhesive residues on the support then the adhesive must be a material that can easily be removed from the support subsequently, for instance by wiping with a volatile solvent.

A variety of pressure-sensitive materials could be used but the material is preferably one that is designed as a flow modifier for improving the production of polymeric films generally, including the reduction of pin holes, fish eyes and orange peel effects in films. It should remain tacky and non-drying throughout use.

Preferably it is a polymer of one or more (meth) acrylic monomers that include at least one alkyl (meth) acrylate where the alkyl group contains 4 to 12, generally 6 to 9, carbon atoms. Preferably the copolymer is formed only of alkyl (meth) acrylate monomers, but minor amounts (for instance below 20% and usually below 10%) other (meth) acrylic monomers can be included if desired. Best results are generally obtained with a blend of at least two alkyl (meth) acrylates where generally 10 to 90% of the blend is alkyl (meth) acrylate where the alkyl group contains 1 to 5 carbon atoms and 20 to 80% by weight alkyl (meth) acrylate where the alkyl group contains 6 to 20, often 6 to 14, carbon atoms. Particularly preferred copolymers are copolymers of methyl, ethyl, propyl or butyl acrylate with 2-ethyl hexyl acrylate, most preferably copolymers of ethyl acrylate with 2-ethyl hexyl acrylate, in proportions of 20:80 to 80:20, often 30:70 to 70:30.

The copolymers preferably have a molecular weight such that they are liquid at room temperature, and for this purpose generally have a weight average molecular weight below 20,000, usually below 10,000, and most preferably below 6,000. Generally the weight average molecular weight is at least 2,000, and usually is at least 3,000.

The polymers can be made by polymerisation in solvent or as an emulsion or in bulk. They can be formulated in conventional manner for application, for example with solvent or other carrier, and if necessary the carrier present during polymerisation can be removed.

If the polymer is to be kept in solution by solvation with a non-volatile solvent, then the polymer can be dissolved in a relatively non-volatile, generally aromatic, solvent. However when, as is more usual, any solvent is to be evaporated (for instance after spraying) then the solvent should be volatile. It will normally be a low-boiling, generally aliphatic, hydrocarbon solvent but it can alternatively be dissolved in any suitable solvent such as an alcohol or ketone or chlorinated solvent.

A suitable material for use in the invention is available from Monsanto under the trade name Modaflow. Other suitable materials are described in GB 1,485,066.

The support is preferably cylindrical but can be, for instance the support of a flat bed scanner or a microscope slide.

Optical scanning can be conducted in conventional manner, for instance to read or input an image.

As an example, a transparent support cylinder is provided having a diameter of 230 mm and formed from transparent polymethyl methacrylate having a refractive index of 1.49. A photographic transparency film material that includes a photographic image is provided, having a refractive index slightly below 1.49.

A viscous, light amber liquid having a viscosity of 110,000 cps at 250° C. and a refractive index of 1.41 and which is a copolymer of 2-ethyl hexyl acrylate and ethyl acrylate having molecular weight around 5,000 is provided (for instance as the material sold under the trade name Modaflow).

A transfer roller has a coating of this liquid applied to it and is used to transfer a uniform coating on to one surface of the transparency. The adhesive-coated surface is applied against the cylinder and the other surface is rolled with a dry roller so as to exclude air from between the transparency and the cylinder and so as to press the transparency into uniform adhesive contact with the cylinder over the entire area of the transparency.

By this means the transparency is secured firmly to the cylinder and is intimate fluid contact with it.

The cylinder is then rotated, typically at 1,000 rpm, and scanned in conventional manner by a light-detecting system that moves axially along the exterior of the cylinder, with the image being read in adjacent circumferential lines.

After scanning the transparency can easily be removed from the cylinder.

We claim:

1. In an optical scanning assembly that includes a transparency having an image that is to be optically scanned by an optical scanner, a transparent support onto which the transparency can be firmly secured in intimate fluid contact to prevent movement during scanning of the image by transmission of light through the transparency and the support, the improvement which comprises the transparency being firmly secured in intimate fluid contact with the transparent support by an overall layer of pressure-sensitive adhesive that wets the surface of the transparency and that releasably secures the transparency to the support, where the difference between the highest and lowest refractive indices of the adhesive layer, the transparency and the support is not more than about 0.2.

2. An assembly according to claim 1 in which the pressure-sensitive adhesive is a low molecular weight polymer of acrylic monomers comprising alkyl (meth) acrylic ester where the alkyl group contains 6 to 14 carbon atoms.

3. An assembly according to claim 2 in which the pressure-sensitive adhesive is a copolymer of 2-ethyl hexyl acrylate.

4. An assembly according to claim 2 in which the copolymer has molecular weight 2,000 to 10,000.

5. An assembly according to claim 1 in which the pressure-sensitive adhesive is a copolymer of alkyl acrylic ester where the alkyl group has 1 to 4 carbon atoms with alkyl (meth) acrylic ester where the alkyl group has 6 to 14 carbon atoms.

6. An assembly according to claim 5 in which the pressure-sensitive adhesive is a copolymer of ethyl acrylate and 2-ethyl hexyl acrylate.

7. An assembly according to claim 5 in which the copolymer has molecular weight 2,000 to 10,000.

8. An assembly according to claim 1 in which the support is formed of polymethyl methacrylate.

9. An assembly according to claim 1 in which the support is a cylinder.

10. In a process of optically scanning an optical scanning assembly that includes a transparency having an image that is to be optically scanned by an optical scanner, a transparent support onto which the transparency is firmly secured in intimate fluid contact to prevent movement during scanning of the image by transmission of light through the transparency and the support, and the transparency is then removed from the support, the improvement which comprises firmly securing the transparency in intimate fluid contact with the transparent support by an overall layer of pressure-sensitive adhesive that wets the surface of the transparency and that releasably secures the transparency to the support, where the difference between the highest and lowest refractive indices of the adhesive layer, the transparency and the support is not more than about 0.2.

* * * * *